United States Patent
Antova et al.

(10) Patent No.: US 9,081,898 B1
(45) Date of Patent: Jul. 14, 2015

(54) AUTOMATIC CAPTURE OF MINIMAL PORTABLE EXECUTABLE BUG REPROS

(75) Inventors: Lyublena R. Antova, Sunnyvale, CA (US); Konstantinos P. Krikellas, San Mateo, CA (US); Florian M. Waas, San Francisco, CA (US)

(73) Assignee: EMC Corporation, Hopkinton, MA (US)

( * ) Notice: Subject to any disclaimer, the term of this patent is extended or adjusted under 35 U.S.C. 154(b) by 435 days.

(21) Appl. No.: 13/538,048

(22) Filed: Jun. 29, 2012

(51) Int. Cl.
*G06F 11/00* (2006.01)
*G06F 11/36* (2006.01)
*G06F 11/07* (2006.01)
*G06F 11/34* (2006.01)

(52) U.S. Cl.
CPC ........ *G06F 11/3668* (2013.01); *G06F 11/0778* (2013.01); *G06F 11/3476* (2013.01); *G06F 11/366* (2013.01)

(58) Field of Classification Search
CPC ............ G06F 11/0775; G06F 11/0778; G06F 11/3476; G06F 11/366; G06F 11/3668
See application file for complete search history.

(56) References Cited

U.S. PATENT DOCUMENTS

| | | | | |
|---|---|---|---|---|
| 8,417,689 | B1* | 4/2013 | Waas et al. | 707/713 |
| 8,452,756 | B2* | 5/2013 | Anderson et al. | 707/719 |
| 8,825,631 | B2* | 9/2014 | Ghosh | 707/713 |
| 2008/0091978 | A1* | 4/2008 | Brodsky et al. | 714/38 |
| 2011/0153594 | A1* | 6/2011 | Hagenbuch et al. | 707/718 |

* cited by examiner

*Primary Examiner* — Michael Maskulinski
(74) *Attorney, Agent, or Firm* — Barry N. Young

(57) ABSTRACT

A minimal portable executable bug repro contains the inputs to a query optimizer, metadata, statistics, process and thread specific information such as stack traces, and state at the time of a crash necessary to reproduce the problem. Objects register with a handler prior to use, and the handler pre-allocates sufficient buffer space to store each. Upon a crash, the handler requests each object to serialize itself into the pre-allocated space, and captures the relevant information in a transactionally consistent way. The executable file may be loaded onto a debugging system, and the execution sequence replayed to analyze the problem.

15 Claims, 3 Drawing Sheets

AUTOMATIC CAPTURE OF MINIMAL PORTABLE EXECUTABLE BUG REPROS

BACKGROUND

This invention relates generally to query optimizers, and more particularly to analyzing optimizers and other types of software components upon the occurrence of errors or crashes to determine the causes, i.e., to "troubleshoot" or "de-bug" the component.

Reproducing bugs (defects, exceptions, runtime errors, etc.) in software components is typically difficult and time-consuming. Obtaining the necessary information to reproduce the problem is often difficult, if not impossible, and requires significant manual effort. Collecting bug details must usually be done after a crash when the system is in an unstable state and some of the necessary troubleshooting information may be unrecoverable.

Query optimizers are among the most complex software components in any database system, and they naturally tend to contain software defects which cause unexpected errors. Despite significant efforts in quality assurance, unexpected errors are occasionally encountered. A self-contained "bug repro" that enables replication of the problem is often the best approach to a speedy resolution. Without a live reproduction scenario, diagnosing and de-bugging software defects in a query optimizer is usually very time consuming and costly. Capturing all the information needed to recreate an issue in the laboratory setting that was originally encountered on a production system is a difficult challenge that requires significant manual interaction, skill, and expertise. This is particularly so for query optimizers. Repros are notoriously difficult to obtain as they require schema definition, the offending query, the system configuration, and many other pieces of data that are difficult to capture in a consistent and accurate way.

There is a need for a mechanism for automatically capturing self-contained executable repro files for problems that occur in software components, such as query optimizers, which is triggered automatically upon the occurrence of a problem with the software component, or upon request. The repro files need to capture the necessary input to the software components and the relevant system state necessary to reproduce the problem, and they should be minimal and portable. It is to these ends that the present invention is directed.

DESCRIPTION OF PREFERRED EMBODIMENTS

The invention is particularly well adapted for use in troubleshooting and debugging query optimizers, and will be described in that context. As will become apparent, however, this is illustrative of only one utility of the invention and that the invention may be used with other types of software components.

As will be described in more detail below, the invention provides an automatic capture process for obtaining minimal, portable and executable bug repros upon the occurrence of a software crash. It overcomes the major challenges discussed above by providing an automatic capture mechanism that captures the problem environment accurately, i.e., in a transactionally consistent manner, and does so while the system is potentially in a degraded state. The problem capture mechanism of the invention is accurate, which is crucial for its usefulness and the success in a highly concurrent system with constantly changing data sets where the time window for collecting the evidence may be very small and often renders collection of data after the fact useless. The invention also meets the challenge of capturing data while the system itself is in an unstable state, be it because of a lack of resources, e.g., being out of memory, or due to inconsistent internal data structures that were either detected before or triggered an error or crash. For capture, the invention does not require additional resources to be allocated, and minimizes data structure accesses to avoid causing additional errors.

Preferably, the automatic capture mechanism of the invention is built into the query optimizer, and the architecture of the optimizer is preferably such that it serializes, as part of its regular workflow, all of the input parameters of an optimization, i.e., the query statement, the referenced metadata and the configuration parameters, as well as a synopsis of the execution environment prior to performing the actual optimization. When an exception occurs, the previously serialized artifacts may be automatically combined and supplemented with optimization run-time information, such as stack traces of involved threads and states of transient objects, using pre-allocated resources. The results may be then dumped to an executable, self-contained, fully portable capture file (a repro) that contains all the parameters needed to rerun the optimizer process and recreate the problem in a troubleshooting environment.

Figure 1:
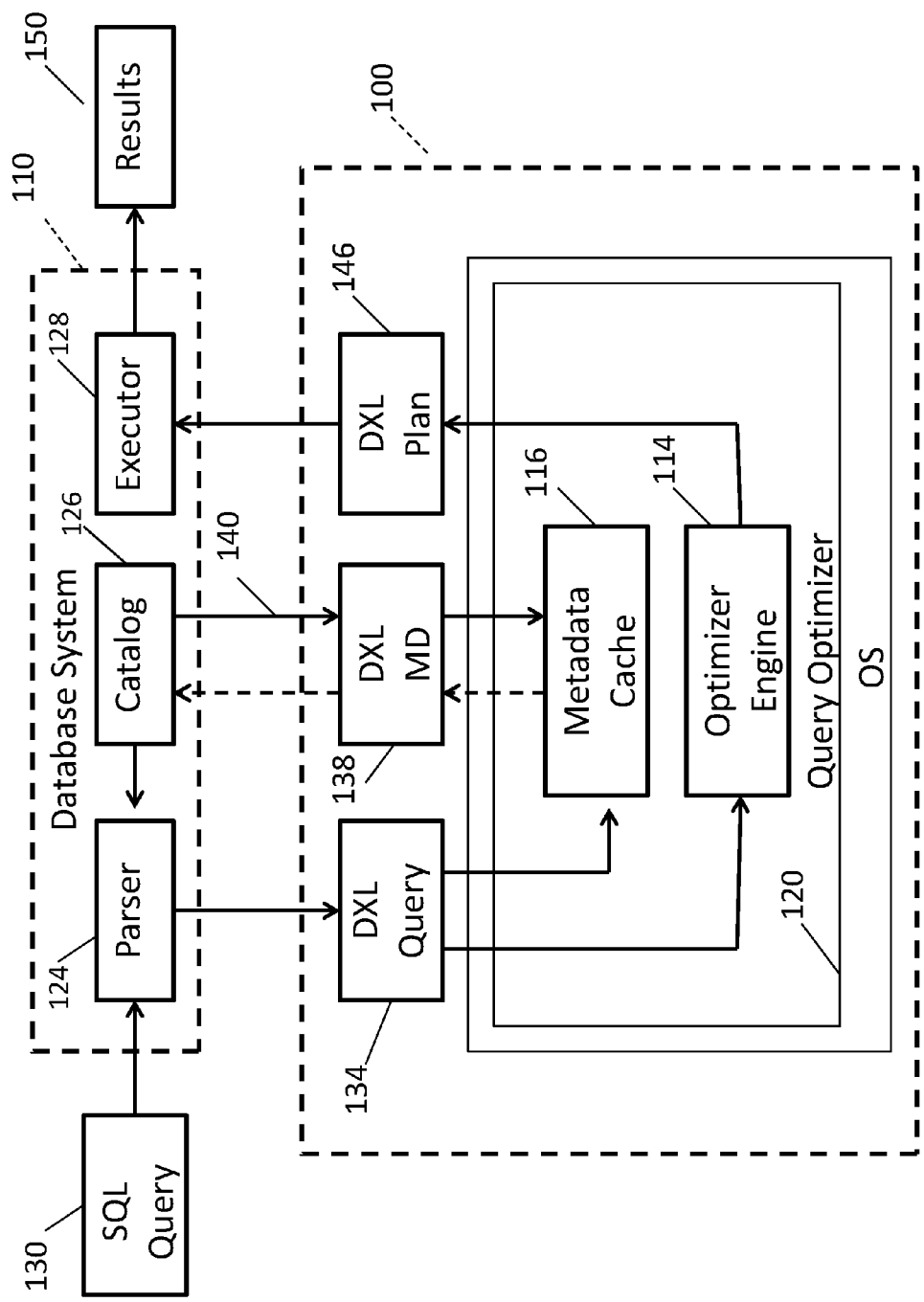
FIG. 1 is a block diagram giving the architecture of an optimizer of the type with which the invention may be employed and showing its relationship to a database system.

FIG. 1 is a block diagram illustrating a query optimizer 100 embodying the invention, and showing the relationship of the optimizer to a database system 110. The optimizer 100 may comprise an optimizer engine 114 and a metadata cache 116. It preferably runs as a separate process completely independently of the database system 110 and does not rely upon any database management system (DBMS) facilities. The optimizer is also preferably authored in a different language from the database system and has its own operating system (OS) abstraction layer 120.

Database system 110 may be a standard database system, such as available from EMC/Greenplum (and referred to as a GPDB) comprising a computer system connected to data stores (not shown in the figure), and a memory comprising computer readable media for storing executable instructions for controlling the operations of the computer. The instructions control the computer to provide a query parser 124, a catalog and an executor 128, among other components as will be described.

The query optimizer preferably communicates with the database system using an XML-based encoding referred to herein as DXL for data exchange. The DXL encoding provides an abstraction between the optimizer and a database system that interacts with the optimizer, and because it is XML-based, it affords a universal description of metadata and relational expressions, yet it may also have custom extensions for system specific intricacies such as binary representations of user-defined types. By using DXL to encode metadata and queries, it is unnecessary for the source database system to be accessible for replay.

As shown in FIG. 1, an incoming SQL query 130 to parser 124 of the database system is communicated to the query optimizer 100 along with referenced metadata. In the query optimizer, the query is converted to a DXL query at 134 and communicated to the optimizer engine 114, and the accompanying metadata is transmitted to the metadata cache 116. The metadata cache may request, at 136, DXL metadata 138 from the database catalog 128. The requested metadata may be supplied by the catalog 126 to the parser 124 and also transmitted at 140 to the metadata DXL converter 138. Metadata converter 138 transforms the metadata to DXL format and supplies it to the metadata cache 116. The optimizer engine 114 uses the DXL metadata and query from converter 134 to generate a query plan which is transmitted at 144 to a DXL plan converter 146 that forwards the plan to an executor 128 for execution. The database system outputs the results of the query at 150.

A variety of error situations can terminate the optimization process of a query statement. These include internal errors that are actively detected by the optimizer, as well as signals or other exceptional situations. In the optimizer, errors are converted into an exception that, unless caught, triggers a data capture handler of the invention to produce a repro file. When an error occurs, the data capture handler harvests relevant information and input data for an ongoing optimization to produce the repro file. This data may include the actual query in algebraic form, the metadata referenced in the query including table and index information, functions, etc., table statistics used by a cardinality estimation module of the optimizer, configuration information, process and thread specific information such as stack traces or thread-control blocks, and environmental information such as control settings and optimizer hints.

For a repro to be useful, it is important that the required information be collected in a way that is consistent with the transaction in which the original optimization occurred. Furthermore, collection must occur with the system in a degraded state where the integrity of data structures may no longer be guaranteed and where additional resources such as memory allocations are not possible as they may trigger further internal errors. The data capture process of the invention satisfies these needs, as will be explained.

Since the query optimizer runs in a separate process form the database, all input and output data must be serialized into DXL form when transferred. This requires that input data to the optimizer be serialized before it is used. The invention advantageously stores and uses this pre-serialized data, instead of having to collect the required information at the time of an exception, to harvest a snapshot that is consistent and represents literally the exact input to the optimizer at the time of the exception. Any component of the optimizer can participate in the data capture process by registering a capture object that will be called as part of handling exceptions with the data capture error handler. Objects can register with the handler by implementing a simple API which is invoked during a crash and serializes the object state to the handler output. In the optimizer, objects such as the input query, metadata, configuration settings, etc. will be registered with the handler. Objects may register with handler at any point during execution. If a crash occurs for object before it is registered, that object did not contribute to crash and may safely be excluded from the repro file. At the time of the crash, the handler requests each registered object to serialize itself into pre-allocated memory space. Capture objects retrieve relevant data, calculate the data size, and copy the data into a designated memory-mapped output buffer. The capture mechanism also causes the OS layer to capture objects to retrieve stack traces and other process details. Unlike pre-serialized DXL documents, the capture objects for system information have to serialize their contents on-the-fly. As will be described, the error handling mechanism of the invention provides support for this by automatic storing required information on a per-thread error context object within a pre-allocated memory scratch space for signal handling and stack trace analysis. Once triggered, the capture objects simply copy the information from the error context to the pre-allocated space in target memory.

The invention interacts with the capture handler on a per-query basis for creating the executable repro file (referred to also as a "dumpfile"), properly positioning DXL entries for each thread inside allocated space within the file with no overlap between entries, and adding an appropriate DXL header and footer to the file. In addition to providing the memory medium where artifacts are recorded in the form of a memory-mapped file or a pre-allocated memory buffer, the handler controls the position where each artifact is recorded within the buffer. Since different threads may raise exceptions concurrently, the handler preferably uses atomic operations to synchronize the artifacts extracted by the different capture objects.

Figure 2:
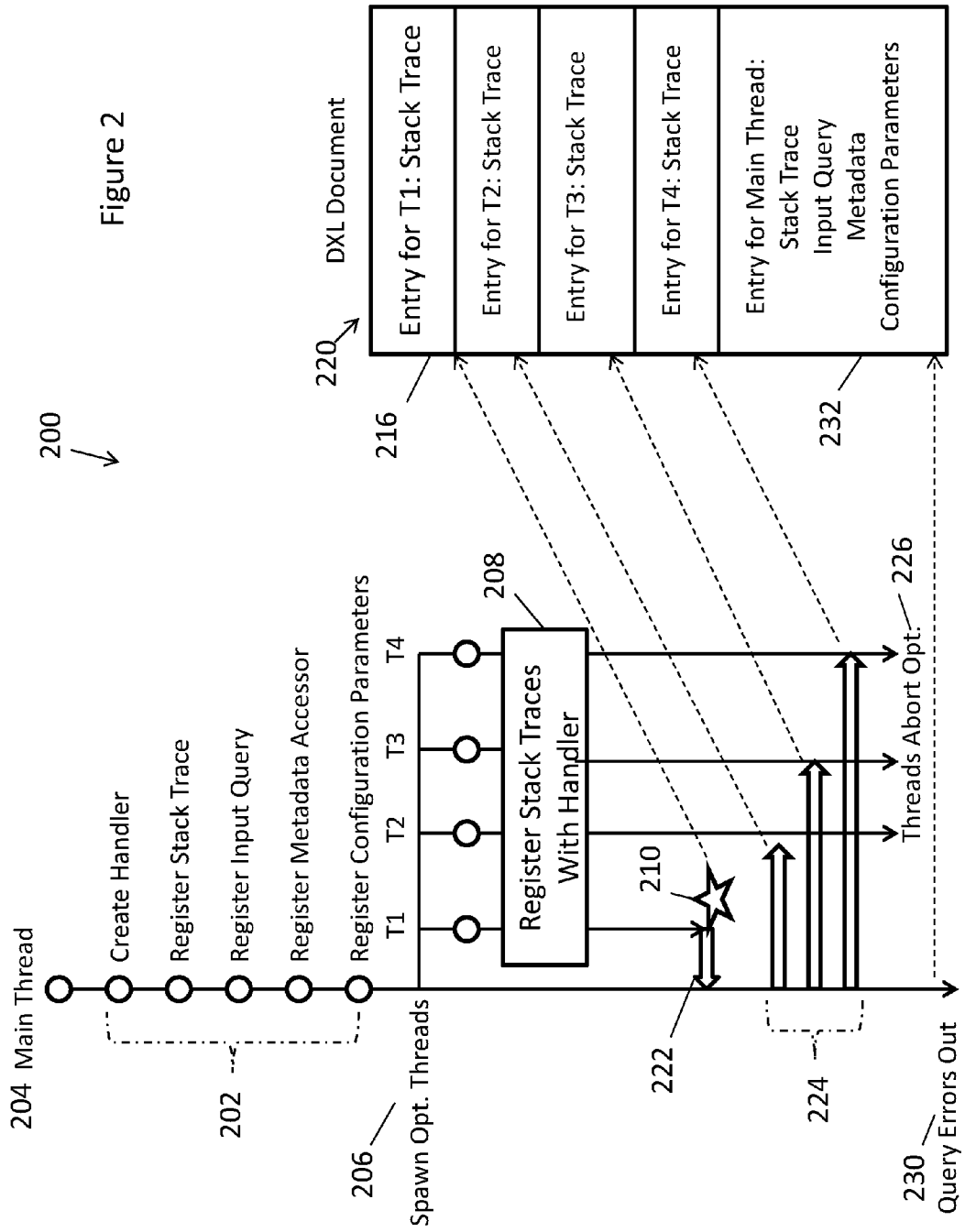
FIG. 2 is a diagrammatic view illustrating a workflow of an embodiment of a process in accordance with the invention.

FIG. 2 illustrates the details of an embodiment of a workflow process 200 of a data capture mechanism in accordance with the invention. In a first step 202, a main processing thread 204 initializes the capture handler, and registers the stack trace, the input query, the metadata accessor, and configuration parameters as artifact objects. At 206, the optimizer spawns one or more processing sub-threads T1, T2, T3 and T4 as part of the normal optimization process. At 208, each spawned sub-thread registers its stack trace with the handler. If during optimization, one of the sub-threads, such as T1, triggers an exception, as at 210, for example, due to a corrupted internal data structure, the error handler calls all registered captured objects of the sub-thread which stores the stack trace T1 at 216 in a buffer memory 220. When it crashes, the sub-thread T1 exits and may notify the main thread 204 at 222, which automatically aborts the remaining sub-threads at 224 and the optimization process at 226. Sub-threads T2-T4 serialize themselves as entries into corresponding locations in buffer memory 220, as shown. Once all of the sub-threads T1-T4 have terminated, the main thread walks the chain of its registered capture objects that collected all pre-serialized information, and copies it into a corresponding location 232 in buffer memory 220. The entries in memory 220 are preferably in the form of a DXL document that comprises the executable repro file (dumpfile), to which the handler may add appropriate header, footer and system description information.

The Appendix gives an example of a simplified listing of the handler dumpfile that includes the stack trace only for the main thread. As will be appreciated, the actual dumpfile will also include the stack trace information for the other sub-threads.

Figure 3:
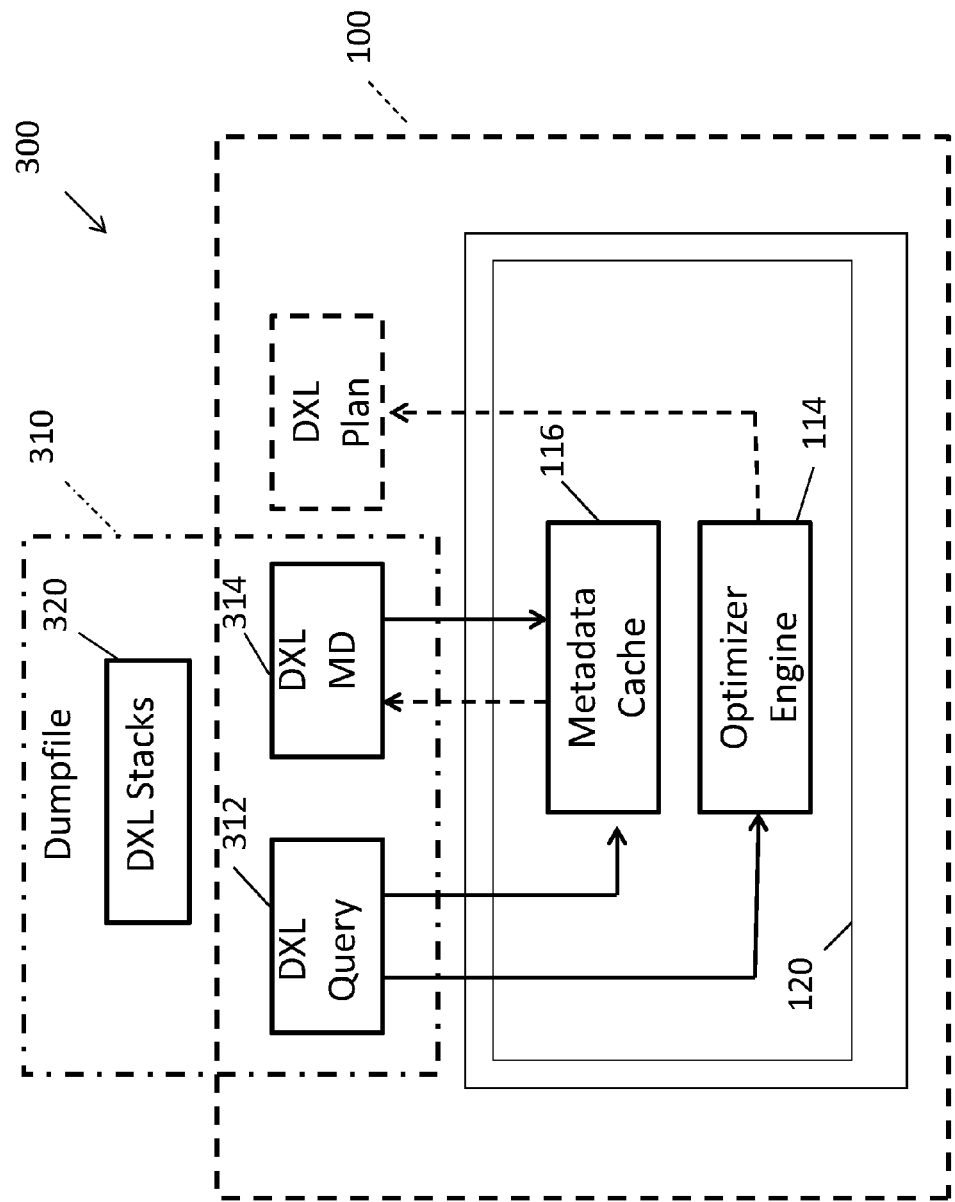
FIG. 3 is a block diagram illustrating the replay of an executable repro file in accordance with the invention.

Since the dumpfile generated by the handler upon a crash is an executable DXL document file, any optimizer instance can load the file to retrieve the input query, the metadata and configuration parameters. These can be used directly to invoke an optimization process that is identical to the one that triggered the crash so that the crash scenario can be replayed. This replay process 300 is illustrated in FIG. 3.

As shown, the optimizer 100 may load the input query 312 from the dumpfile 310, create a file-based provider for the metadata 314, and set the same configuration parameters into the optimizer. The optimizer may then spawn the same optimization threads from the DXL stack traces 320 recorded in the dumpfile. Since the input query and all other parameters and conditions are the same, executing the repro on the optimizer allows the optimizer operation to be replayed just as it did at the time of the crash, so that the error may be reproduced, analyzed and corrected.

Moreover, the repro file is minimal, portable and executable. Since it contains a synopsis of the original system, the repro file may be transmitted to another site and run on any sized system to reproduce the error and the precise conditions under which it occurred. This enables developers to replay, investigate and troubleshoot errors on regular development laptops without the necessity of access to a large database system. Additionally, the invention may be integrated with an automatic problem reporting software to transmit the generated executable repro file from the customer site to a support center.

An embodiment of the invention affords a computer storage product comprising computer readable physical (non-transitory) storage medium storing the workflow framework as executable instructions for controlling the operations of a computer to perform the processing operations described herein. The computer readable medium may be any standard well-known storage media, including, but not limited to magnetic media, optical media, magneto-optical media, and hardware devices configured to store and execute program code, such as application-specific integrated circuits (ASICs), programmable logic devices, and semiconductor memory such as ROM and RAM devices.

While the foregoing has been with reference to preferred embodiments of the invention, it will be appreciated by those skilled in the art that changes to these embodiments may be made without departing from the principles and spirit the invention, the scope of which is defined in the appended claims.

APPENDIX

```
<?xml version="1.0"  encoding = "UTF-8"?>
<dxl:DXLMsg xmlns:dxl="http://greenplum.com/dxl/v1">
    <dxl:Thread   Id="0" >
      <dxl:Stacktrace>
      1     0x000e8106df   gpos : : CException::Raise
      2     0x000137d853   COptTasks : : PvOptimizeTask
      3     0x000e81cb1c   gpos : : CTask : : Execute
      4     0x000e8180f4   gpos : : CWorker : : Execute
      5     0x000e81e811   gpos : : CAutoTaskProxy : : Execute
      </dxl:Stacktrace>
      <dxl:TraceFlags Value="gp_optimizer_hashjoin" />
        <dxl:Metadata System Ids="0.GPDB">
          <dxl:Type Mdid="0.9.1.0" Name="int4"
            IsRedistributable="true" Length="4" />
          <dxl:RelStats Mdid="2.688.1.1" Name="r"Rows="10"/>
          <dxl:Relation Mdid="0.688.1.1" Name="r"
            Distribution Policy="Hash" DistributionColumns="0">
            <dxl:Columns>
              <dxl:Column Name="a" Attno="1" Mdid="0.9.1.0" />
            </dxl:Columns>
          </ d x l : R e l a t i o n>
        </dxl:Metadata>
        <dxl:Query>
          <dxl:OutputColumns>
             <dxl:Ident Colld="1" Name="a" Mdid="0.9.1.0"/>
          </dxl:OutputColumns>
          <dxl:LogicalGet>
            <dxl:TableDescriptor Mdid="0.688.1.1" Name="r">
              <dxl:Columns>
                <dxl:Column Attno="1" Name="a" Mdid="0.9.1.0"/>
              </dxl:Columns>
            </dxl:TableDescriptor>
          </dxl:LogicalGet>
        </dxl:Query>
    </dxl:Thread>
</dxl:DXLMsg>
```

The invention claimed is:

1. A method of automatically capturing for reproduction software errors in a database query optimizer, comprising:
   pre-serializing input data to the optimizer before the data is used;
   registering, with an error handler, first capture objects that obtain relevant input data, determine the relevant input data size, and copy the relevant input data into a buffer; and
   obtaining information by second capture objects about optimizer thread stack traces and process details upon an error occurring, and copying said information into a pre-allocated space in a memory, wherein said information obtained by the second capture objects is serialized during optimizer processing as the information is obtained, and said pre-allocated space comprises scratch space reserved in said buffer.

2. The method of claim 1 further comprising creating using a capture handler an executable file containing said data and said information obtained by the first and second capture objects, the executable file being created to contain that data and information necessary for reproduction of optimizer processes and processing conditions at the time of said error.

3. The method of claim 1, wherein said optimizer runs in a separate process that is completely independent of a database system associated with the optimizer.

4. A system for automatically capturing for reproduction software errors occurring in a database query optimizer, comprising;
   a converter for pre-serializing data input to the optimizer before the data is used;
   an error handler for registering first capture objects that obtain relevant input data from the pre-serialized input data, determining the relevant pre-serialized data size, and copying the relevant pre-serialized data to a buffer memory, the relevant pre-serialized input data comprising an input query, referenced metadata, and configuration parameters;
   an optimizer engine for processing the input query in a main processing thread and a plurality of sub-threads spawned by the main thread, the optimizer engine obtaining through second capture objects information about stack traces of threads upon an error occurring, and copying said information into said buffer memory.

5. The system of claim 4, wherein said optimizer has a separate operating system from a database associated with the optimizer, the operating system providing an abstraction layer that isolates the optimizer from the database.

6. Computer readable non-transitory storage medium product for storing executable instructions for controlling the operation of a computer to automatically capture for reproduction software errors in a database query optimizer, comprising instructions for:
   pre-serializing input data to the optimizer before the data is used;
   registering, with an error handler, first capture objects that obtain relevant input data, determine the relevant input data size, and copy the relevant input data into a buffer; and
   obtaining information by second capture objects about optimizer thread stack traces and process details upon an error occurring, and copying said information into a pre-allocated space in a memory, wherein said instructions serialize the information obtained by the second capture objects during optimizer processing as the information is obtained, and said pre-allocated space comprises scratch space reserved in said buffer.

7. The computer readable storage product of claim 6 further comprising instructions for creating using a capture handler an executable file containing said data and said information obtained by the first and second capture objects, the executable file being created to contain that data and information necessary for reproduction of optimizer processes and processing conditions at the time of said error.

8. The computer readable storage product of claim 6, wherein, the instructions include instructions, upon an error condition occurring in a processing threads, for invoking said error handler to cause said first and said second capture objects to copy said data and said information into a portable executable repro file.

9. The computer readable storage product of claim 8, wherein said executable repro file comprises all of the optimizer information and data necessary to replicate the optimizer conditions and processing at the occurrence of the error.

10. The computer readable storage product of claim 9 further comprising instructions for executing said executable repro file on a de-bugging system to replay said optimizer process for analysis and correction of said error.

11. The computer readable storage product of claim 10 further comprising instructions for automatically transmitting the executable repro file to the debugging system.

12. A method of automatically capturing for reproduction software errors in a database query optimizer, comprising:
pre-serializing input data to the optimizer before the data is used, said input data comprising an input query, referenced metadata, and system configuration parameters;
registering, with an error handler, first capture objects that obtain relevant input data, determine the relevant input data size, and copy the relevant input data into a buffer;
obtaining information by second capture objects about optimizer thread stack traces and process details upon an error occurring, and copying said information into a pre-allocated space in a memory; and
creating a main processing thread in the optimizer for the input query, the main processing thread creating said error handler and spawning optimizer sub-threads for processing said input query, said optimizer sub-threads producing said optimizer thread stack information captured by the second capture objects.

13. The method of claim 12, wherein upon an error condition occurring in one of said sub-threads, invoking said error handler to cause said first and said second capture objects to copy said data and said information into a portable executable repro file.

14. The method of claim 13 further comprising executing said executable repro file on a de-bugging system to replay said optimizer process for analysis and correction of said error.

15. Computer readable non-transitory storage medium product for storing executable instructions for controlling the operation of a computer to automatically capture for reproduction software errors in a database query optimizer, comprising instructions for:
pre-serializing input data to the optimizer before the data is used;
registering, with an error handler, first capture objects that obtain relevant input data, determine the relevant input data size, and copy the relevant input data into a buffer;
obtaining information by second capture objects about optimizer thread stack traces and process details upon an error occurring, and copying said information into a pre-allocated space in a memory; and
creating a main processing thread in the optimizer for the input query, the main processing thread creating said error handler and spawning optimizer sub-threads for processing said input query, said optimizer sub-threads producing said optimizer thread stack information captured by the second capture objects.

* * * * *